United States Patent
Kataoka et al.

(10) Patent No.: US 10,936,816 B2
(45) Date of Patent: Mar. 2, 2021

(54) NON-TRANSITORY COMPUTER-READABLE STORAGE MEDIUM, ANALYSIS METHOD, AND ANALYSIS DEVICE

(71) Applicant: FUJITSU LIMITED, Kawasaki (JP)

(72) Inventors: Masahiro Kataoka, Kamakura (JP); Masao Ideuchi, Hachioji (JP); Seiji Okura, Meguro (JP)

(73) Assignee: FUJITSU LIMITED, Kawasaki (JP)

( * ) Notice: Subject to any disclaimer, the term of this patent is extended or adjusted under 35 U.S.C. 154(b) by 43 days.

(21) Appl. No.: 15/940,220

(22) Filed: Mar. 29, 2018

(65) Prior Publication Data

US 2018/0293225 A1 Oct. 11, 2018

(30) Foreign Application Priority Data

Apr. 10, 2017 (JP) .............................. JP2017-077561

(51) Int. Cl.
*G06F 40/289* (2020.01)
*G06F 40/30* (2020.01)
*G06F 40/284* (2020.01)

(52) U.S. Cl.
CPC .......... *G06F 40/289* (2020.01); *G06F 40/284* (2020.01); *G06F 40/30* (2020.01)

(58) Field of Classification Search
CPC ....... G06F 40/289; G06F 40/284; G06F 40/30
USPC ....................................................... 715/255
See application file for complete search history.

(56) References Cited

U.S. PATENT DOCUMENTS

| | | | | |
|---|---|---|---|---|
| 4,750,122 A | * | 6/1988 | Kaji | G06F 40/284 704/1 |
| 4,807,181 A | * | 2/1989 | Duncan, IV | G06F 40/232 715/236 |
| 4,868,750 A | * | 9/1989 | Kucera | G06F 40/289 704/8 |
| 5,940,836 A | * | 8/1999 | Fukushima | G06F 16/319 |

(Continued)

FOREIGN PATENT DOCUMENTS

| | | |
|---|---|---|
| JP | 2000-231563 A | 8/2000 |
| JP | 2006-048685 | 2/2006 |

(Continued)

OTHER PUBLICATIONS

Korean Office Action dated Apr. 17, 2019 for corresponding Korean Patent Application No. 10-2018-0039951, with English Translation, 10 pages.

(Continued)

*Primary Examiner* — Michael Colucci
(74) *Attorney, Agent, or Firm* — Fujitsu Patent Center

(57) ABSTRACT

A non-transitory computer-readable storage medium storing a program that causes a computer to execute a process, the process including generating index information regarding a first string data including a plurality of words or phrases, the index information indicating appearance positions of each of characters, setting flag information to the index information, the flag information indicating head positions plurality of words or phrases and end positions of each of the plurality of words or phrases, and extracting, from a second string data, a plurality of dividable words or phrases corresponding to the plurality of words or phrases by using the index information to which the flag information is set.

5 Claims, 14 Drawing Sheets

---

140a

··· white··· ···Thank you, everybody, for being here. I want to welcome many state and local leaders; and we've had them all over the White House today, and it's a great honor··· ···white hunter···

(56) References Cited

U.S. PATENT DOCUMENTS

| | | | | |
|---|---|---|---|---|
| 6,169,999 | B1* | 1/2001 | Kanno | G06F 40/242 715/255 |
| 6,546,401 | B1 | 4/2003 | Iizuka et al. | |
| 6,879,951 | B1* | 4/2005 | Kuo | G10L 13/08 704/1 |
| 2003/0200211 | A1* | 10/2003 | Tada | G06F 16/93 |
| 2006/0020607 | A1 | 1/2006 | Patterson | |
| 2006/0106604 | A1* | 5/2006 | Okimoto | G10L 15/06 704/243 |
| 2011/0202518 | A1* | 8/2011 | Maedera | G06F 40/47 707/706 |
| 2013/0110766 | A1* | 5/2013 | Promhouse | G06F 9/466 707/607 |
| 2013/0262486 | A1* | 10/2013 | O'Dell | G06F 16/30 707/755 |

FOREIGN PATENT DOCUMENTS

| | | |
|---|---|---|
| KR | 2001-0015368 A | 2/2001 |
| KR | 10-1247346 B1 | 3/2013 |

OTHER PUBLICATIONS

Extended European Search Report dated Nov. 14, 2018 for corresponding European Patent Application No. 18165856.8, 11 pages.
Anonymous, "Inverted index—Wikipedia", Jan. 9, 2016, XP055355061, Retrieved from the Internet: URL:https://en.wikipedia.org/w/index.php?title=Inverted_index&oldid=698960983 [retrieved on Mar. 15, 2017], 3 pages.
Williams, Hugh E. et al.,"Fast Phrase Querying With Combined Indexes", ACM Transactions on Information Systems, vol. 22, No. 4, Oct. 1, 2004, pp. 573-594, XP058096021.
Fujioka, Kengo et al.,"Application of Bitmap Index to Information Retrieval", Proceedings of the 17th International Conference on World Wide Web, WWW 2008, Beijing, China, Apr. 21, 2008, pp. 1109-1110, XP058289451.
Korean Office Action dated Nov. 28, 2019 for corresponding Korean Patent Application No. 10-2018-0039951, with English Translation, 6 pages.
Korean Office Action dated Mar. 30, 2020 of corresponding Korean Patent Application No. 10-2018-0039951, with English Translation, 10 pages.
Japanese Office Action dated Oct. 6, 2020 for corresponding Japanese Patent Application No. 2017-077561, with English Translation, 6 pages.
Korean Office Action dated Nov. 27, 2020 for corresponding Korean Patent Application No. 10-2018-0039951, with English Translation, 8 pages.

* cited by examiner

··· white··· ···Thank you, everybody, for being here. I want to welcome many state and local leaders; and we've had them all over the White House today, and it's a great honor··· ···white hunter···

FIG. 4

| WORD/PHRASE | PART OF SPEECH | CONJUGATED FORM |
|---|---|---|
| go | VERB | go-went-gone |
| ... | ... | ... |
| white | NOUN | – |
| White△House | NOUN | – |
| white△ | NOUN | – |
| ... | ... | ... |

| | | 35 34 33 32 31 30 29 28 27 26 25 24 23 22 21 20 19 18 17 16 15 14 13 12 11 10 9 8 7 6 5 4 3 2 1 0 | |
|---|---|---|---|
| W | 0 0 0 0 | 0 0 0 0 0 0 0 0 0 0 1 0 0 0 0 0 0 0 0 0 1 0 0 0 0 1 0 0 0 0 0 0 | ~21 |
| | | e t n u o h △ e t i h w < > e s u o H △ e t i h W < > e t i h w | |
| h | 0 0 0 0 | 0 0 0 0 0 1 0 0 0 1 0 0 0 0 0 1 0 0 0 0 1 0 0 0 1 0 0 0 0 0 0 0 | ~22 |
| i | 0 0 0 0 | 0 0 0 0 0 0 0 0 1 0 0 0 0 0 0 0 0 0 1 0 0 0 1 0 0 0 0 0 0 0 0 | ~23 |
| t | 0 0 0 0 | 0 0 0 0 0 0 0 1 0 0 0 0 0 0 0 0 1 0 0 0 0 1 0 0 0 0 0 0 0 0 | ~24 |
| e | 0 0 0 0 | 0 0 0 0 0 0 1 0 0 0 0 1 0 0 0 1 0 0 0 0 1 0 0 0 0 0 0 0 0 0 | ~25 |
| △(SP) | 0 0 0 0 | 0 0 0 0 0 1 0 0 0 0 0 0 0 0 1 0 0 0 0 0 0 0 0 0 0 0 0 0 0 | ~26 |
| o | 0 0 0 0 | 0 0 0 0 0 0 0 1 0 0 0 0 1 0 0 0 0 0 0 0 0 0 0 0 0 0 0 0 0 0 | ~27 |
| u | 0 0 0 0 | 0 0 0 0 0 0 0 0 0 0 0 1 0 0 0 0 0 0 0 0 0 0 0 0 0 0 0 0 0 0 | ~28 |
| s | 0 0 0 0 | 0 0 0 0 0 0 0 0 1 0 0 0 0 0 0 0 0 0 0 0 0 0 0 0 0 0 0 0 0 0 | ~29 |
| <US> | 0 0 0 0 | 0 0 0 0 0 0 0 0 1 0 0 0 0 0 0 0 1 0 0 0 1 0 0 0 0 0 | ~30 |
| HEAD | 0 0 0 0 | 0 0 0 0 0 0 0 1 0 0 0 0 0 0 0 1 0 0 0 0 1 0 0 0 0 0 0 | ~31 |
| END | 0 0 0 0 | 0 0 0 0 0 0 0 0 0 1 0 0 0 0 0 0 0 1 0 0 0 0 0 0 0 0 | ~32 |

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|---|
| w(ASCII) | 0 | 0 | 0 | 0 | 0 | 0 | 0 | 1 | 0 | 0 | 0 | 0 | 0 | 0 | 0 | 0 | 0 | 0 | 0 | 1 | 0 | 0 | 0 | 0 | 0 | 1 | 0 | 0 | 0 | 0 | 0 | 0 | ~21a |
| | 0 | 0 | 0 | 0 | 0 | 0 | 0 | 1 | 0 | 0 | 0 | 0 | 0 | 0 | 0 | 0 | 0 | 0 | 0 | 1 | 0 | 0 | 0 | 0 | 0 | 1 | 0 | 0 | 0 | 0 | 0 | 0 | ~21b |
| h(ASCII) | 0 | 0 | 0 | 0 | 0 | 0 | 1 | 0 | 0 | 0 | 0 | 0 | 0 | 0 | 0 | 0 | 0 | 0 | 1 | 0 | 0 | 0 | 0 | 0 | 0 | 1 | 0 | 0 | 0 | 0 | 0 | 0 | ~22a |
| | 0 | 0 | 0 | 0 | 0 | 0 | 1 | 0 | 0 | 0 | 0 | 0 | 0 | 0 | 0 | 0 | 0 | 0 | 1 | 0 | 0 | 0 | 0 | 0 | 0 | 1 | 0 | 0 | 0 | 0 | 0 | 0 | ~22b |
| ... | | | | | | | | | | | | | | | | | | | | | | | | | | | | | | | | | |
| <US> | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 1 | 0 | 0 | 0 | 0 | 0 | 0 | ~30a |
| | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 1 | 0 | 0 | 0 | 0 | 0 | 0 | ~30b |

NON-TRANSITORY COMPUTER-READABLE STORAGE MEDIUM, ANALYSIS METHOD, AND ANALYSIS DEVICE

CROSS-REFERENCE TO RELATED APPLICATION

This application is based upon and claims the benefit of priority of the prior Japanese Patent Application No. 2017-77561, filed on Apr. 10, 2017, the entire contents of which are incorporated herein by reference.

FIELD

The embodiment discussed herein is related to a non-transitory computer-readable storage medium, an analysis method and an analysis device.

BACKGROUND

A conventional art (conventional art 1) of morphologically analyzing a target document and dividing the document into units of word, has been known. According to the conventional art 1, for example, in the case where a Japanese phrase (compound word) is registered in a dictionary used in morphological analysis, when the phrase is determined to be the most suited for a candidate for division, the phrase is output.

However, according to the conventional art 1, an English phrase is registered, the phrase is unconditionally divided with a space, and the phrase is not output. For example, according to the conventional art 1, even when "White House" is registered in the dictionary used in morphological analysis, the most suitable division candidates are determined as "White" and "House", and the meaningful unity "White House" is not determined as the most suitable candidate.

A conventional art (conventional art 2) of encoding a target document in units of word has also been known. According to the conventional art 2, a group of target documents are morphologically analyzed to be encoded in units of word, and a transposition index on the presence/absence of the word is generated. For example, according to the conventional art 2, each word that appears multiple times is encoded to generate the transposition index.

Another conventional art (conventional art 3) is disclosed in Patent document 1. Patent document 1 describes that phrases are collected from a target document to acquire co-occurrence statistics.

CITATION LIST

Patent Document

[Patent Document 1]
Japanese Laid-open Patent Publication No. 2006-48685

SUMMARY

As one aspect, a non-transitory computer-readable storage medium storing a program that causes a computer to execute a process, the process including generating index information regarding a first string data including a plurality of words or phrases, the index information indicating appearance positions of each of characters, setting flag information to the index information, the flag information indicating head positions plurality of words or phrases and end positions of each of the plurality of words or phrases, and extracting, from a second string data, a plurality of dividable words or phrases corresponding to the plurality of words or phrases by using the index information to which the flag information is set.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of data structure of character string data.

FIG. 4 illustrates an example of data structure of dictionary data.

FIG. 5 illustrates an example of data structure of array data.

FIG. 6 illustrates an example of data structure of an index.

FIG. 8 illustrates an example of data structure of index data.

FIG. 10 is a view (1) for describing an example of processing of extracting words or phrases.

FIG. 11 is a view (2) for describing an example of processing of extracting words or phrases.

DESCRIPTION OF EMBODIMENTS

However, according to the above-described conventional arts, even when an English word and a meaningful phrase are registered in the dictionary used in morphological analysis, the English word or phrase may not be disadvantageously divided in units of meaning.

For example, according to the conventional art 1, even when the English word or phrase that appears multiple times is registered in the dictionary, the output divided English word or phrase is not necessarily separated in units of meaning. For this reason, the English word or phrase associated with the transposition index generated according to the conventional art 2 is not necessarily helpful for retrieval.

In Patent document 1, to directly correct phrases from the target document and consider their co-occurrence relations, the operation of extracting only suitable phrases based on the co-occurrence relations is requested. Further, in Patent document 1, stop words such as "off" and "out" have to be combined with another word, like "take off" and "take out".

An Embodiment of an analysis program, an analysis method, and an analysis apparatus in this application will be described below in detail with reference to figures. Noted that the disclosure is not limited to the embodiment.

Embodiment

Figure 1:
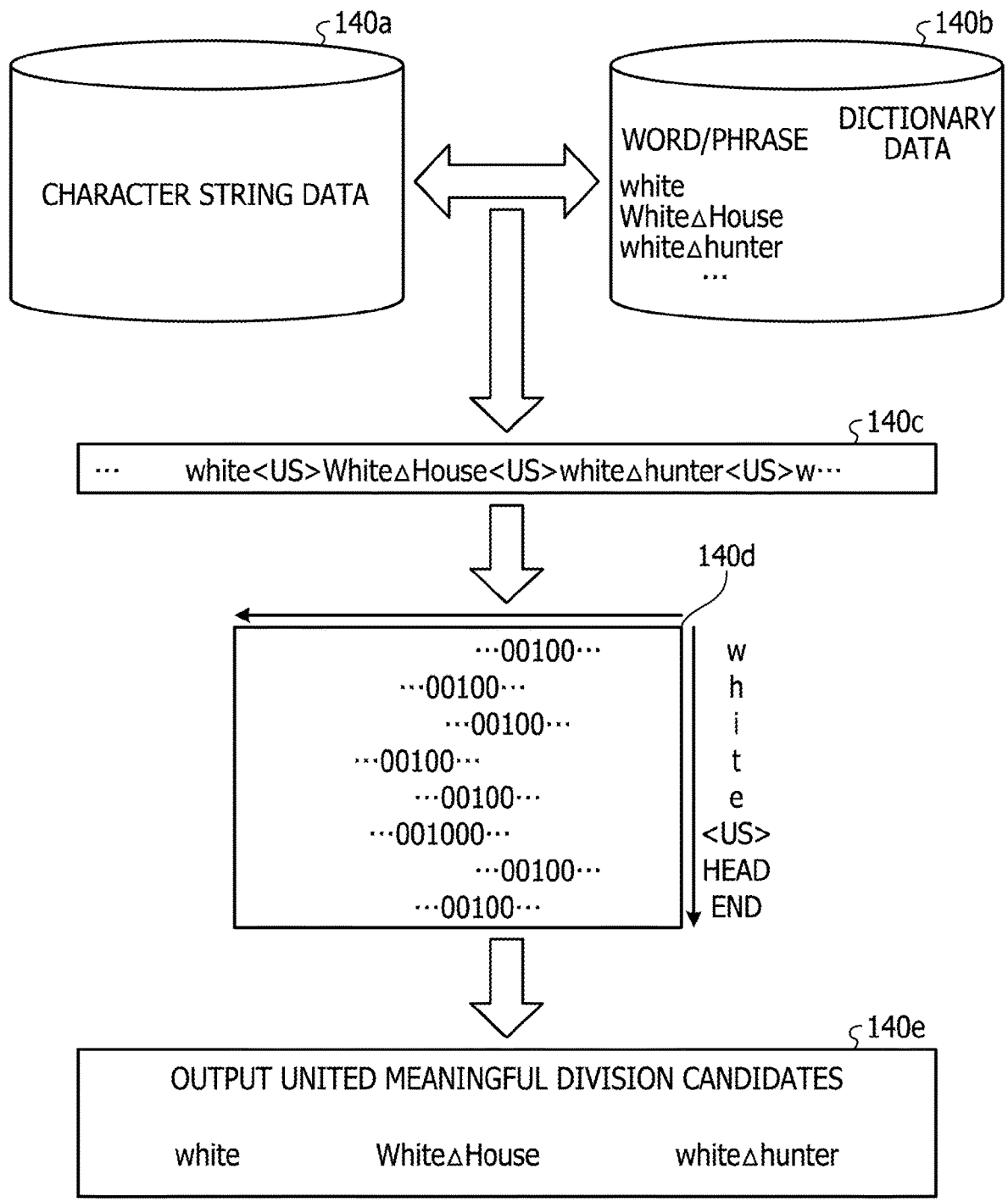
FIG. 1 is a view for describing an example of processing of an analysis apparatus in this embodiment.

FIG. 1 is a view illustrating an example of processing of the analysis apparatus in this embodiment. As illustrated in FIG. 1, the analysis apparatus executes following processing, when a word and a meaningful phrase as division candidates are extracted from character string data 140a. For example, the character string data 140a is defined as data of an English document.

The analysis apparatus compares the character string data 140a with dictionary data 140b. The dictionary data 140b defines words and phrases as the division candidates. In this embodiment, as an example, a space between a plurality of words constituting a phrase is expressed as "Δ".

The analysis apparatus scans the character string data 140a from the head, extracts a character string that hits for the words or phrases defined in the dictionary data 140b, and is stored in array data 140c.

The array data 140c has the words or phrases defined in the dictionary data 140b in the character string included in the character string data 140a. <US (unit separator)> is registered in a pause of each word or phrase. For example, the analysis apparatus compares the character string data 140a with the dictionary data 140b, and generates the array data 140c illustrated in FIG. 1, when "white", "WhiteΔHouse", "whiteΔhunter" registered in the dictionary data 140b hit in this order.

When generating the array data 140c, the analysis apparatus generates an index 140d corresponding to the array data 140c. The index 140d is information that associates a character with an offset. The offset represents the position of the corresponding character on the array data 140c. For example, when a character "w" is present at the n1$^{th}$ character from the head of the array data 140c, in a line (bitmap) corresponding to the character "w" of the index 140d, a flag "1" is set at the position of the offset n1.

The index 140d in this embodiment associates the positions of "head", "end", <US> of the word or phrase with the respective offsets. For example, the head of the word "white" is "w", and the end of the word "white" is "e". When the head "w" of the word "white" is present at the n2$^{th}$ character from the head of the array data 140c, in a line corresponding to the head of the index 140d, a flag "1" is set at the position of the offset n2. When the end "e" of the word "white" is present at the n3$^{th}$ character from the head of the array data 140c, in a line corresponding to the "end" of the index 140d, a flag "1" is set at the position of the offset n3.

The head of the phrase "WhiteΔHouse" is "W", and the end of the phrase "WhiteΔHouse" is "e". When the head "W" of the phrase "WhiteΔHouse" is present at n4$^{th}$ character from the head of the array data 140c, in the line corresponding to "head" of the index 140d, a flag "1" is set at the position of the offset n4. When the end "e" of the phrase "WhiteΔHouse" is present at the n5$^{th}$ character from the head of the array data 140c, in the line corresponding to the "end" of the index 140d, a flag "1" is set at the position of the offset n5.

When the "<US>" is present at the n6$^{th}$ character from the head of the array data 140c, in a line corresponding to the "<US>" of the index 140d, a flag "1" is set at the position of the offset n6.

Referring to the index 140d, the analysis apparatus may grasp the position of the character constituting the words and phrases included in the character string data 140a, as well as head, end, and pause (<US>) of the character. The character string from the head to the end, which may be determined by the index 140d, may be regarded as one meaningful character string (phrase).

Based on the index 140d, the analysis apparatus determines a longest match character string using the character string from the head to the end as a pause unit, to extract dividable words or phrases from the character string data 140a. In an extraction result 140e illustrated in FIG. 1, the word "White", and meaningful phrases "WhiteΔHouse", and "whiteΔhunter" are extracted.

As described above, the analysis apparatus generates the index 140d about registration items in the dictionary data 140b, based on the character string data 140a and the dictionary data 140b, and sets flags that may determine the head and the end for each of the registration items. Then, using the index 140d, the analysis apparatus extracts a plurality of dividable words or phrases from the character string data 140a. For example, using the index 140d, a united meaningful character string defined in the dictionary data 140b may be identified according to the flags of the head and the end, and the longest match character string is determined using the character string from the head to the end as a unit of pause, thereby extracting dividable words or phrases. Therefore, words and meaningful phrases may be recognized to achieve analysis using values of the words and phrases.

For example, an example of analysis using values of words and phrases is the processing of vectorizing character string data in units of word and phrase extracted by the analysis apparatus.

The analysis apparatus in this embodiment uses the index 140d to extract words and phrases from the character string data 140a, and does not calculate co-occurrence statistics as in Patent document 1. For this reason, calculation costs may be reduced. In such circumstances, when it is attempted to prepare a dictionary of meaningful phrases, the size of the dictionary becomes too large and thus, encoding corresponding to the phrases as units of meaning has not been conventionally implemented.

Figure 2:
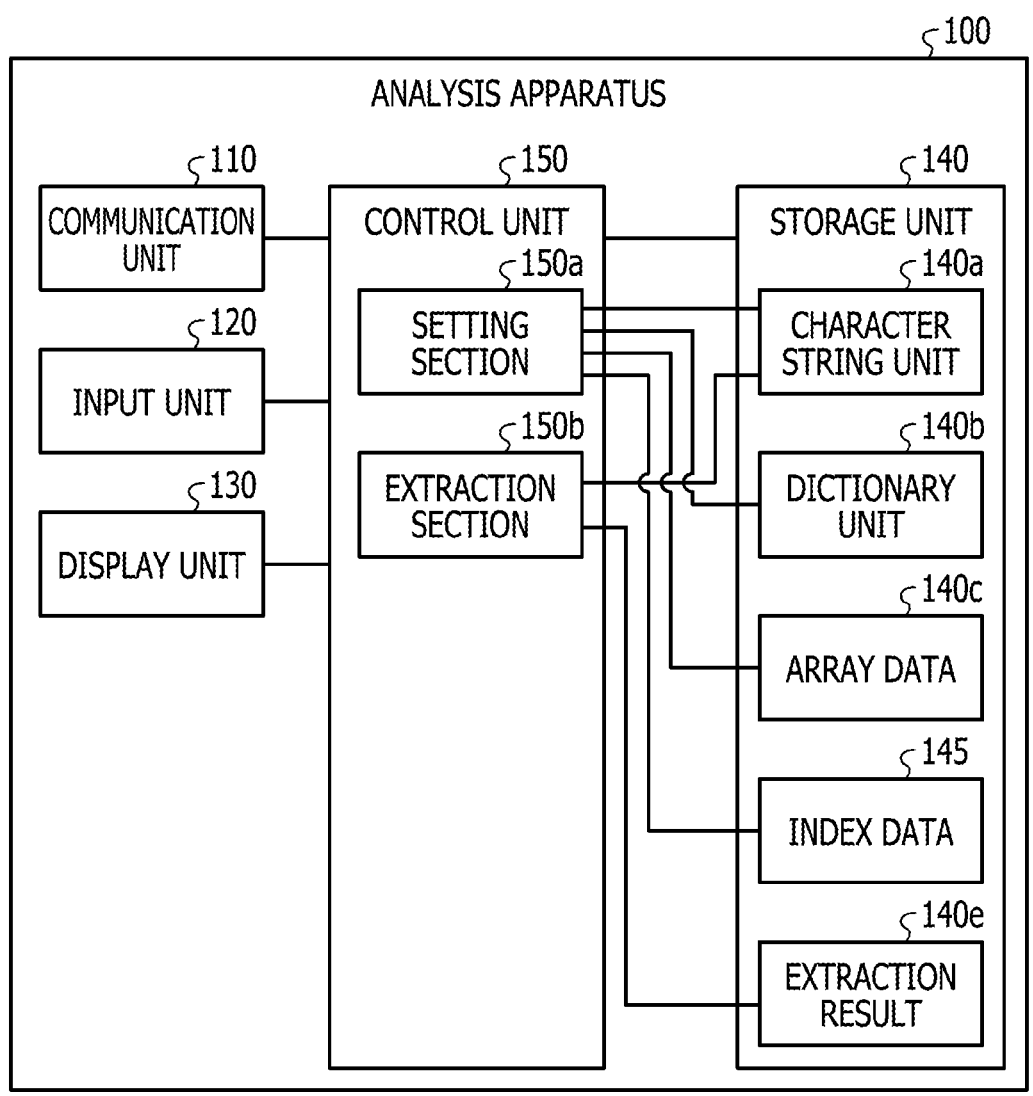
FIG. 2 is a functional block diagram illustrating a configuration of the analysis apparatus in this embodiment.

FIG. 2 is a functional block diagram illustrating a configuration of the analysis apparatus in this embodiment. As illustrated in FIG. 2, the analysis apparatus 100 has a communication unit 110, an input unit 120, a display unit 130, a storage unit 140, and a control unit 150.

The communication unit 110 is a processing unit that communicates with other external devices via a network. The communication unit 110 corresponds to a communication device. For example, the analysis apparatus 100 may receive the character string data 140a and the dictionary data 140b from the external device, and store them in the storage unit 140.

The input unit 120 is an input device that inputs various information to the analysis apparatus 100. For example, the input unit 120 corresponds to a keyboard, a mouse, or a touch panel.

The display unit 130 is a display device that displays various information output from the control unit 150. For example, the display unit 130 corresponds to a liquid crystal display or a touch panel.

The storage unit 140 has the character string data 140a, the dictionary data 140b, the array data 140c, index data 145, and the extraction result 140e. The storage unit 140 corresponds to a semiconductor memory element such as a flash Memory or a storage device such as a hard disk drive (HDD).

The character string data 140a is document data to be processed. FIG. 3 illustrates an example of data structure of character string data. As illustrated in FIG. 3, the character string data 140a is written in English, for example. In the example illustrated in FIG. 3, a space "Δ" between words is not illustrated.

The dictionary data 140b is information that defines words or phrases as division candidates. The phrase included in the dictionary data 140b is constituted of a plurality of words, which forms one meaningful phrase. FIG. 4 illustrates an example of data structure of the dictionary data. As illustrated in FIG. 4, the dictionary data 140b associates word/phrase with part of speech and conjugated form. The word/phrase indicates words or phrases as the division candidate. The part of speech of the part of speech of the words stored in the column the "word/phrase". The conjugated form indicates the conjugated form of the words stored in the column the "word/phrase".

Figure 5:
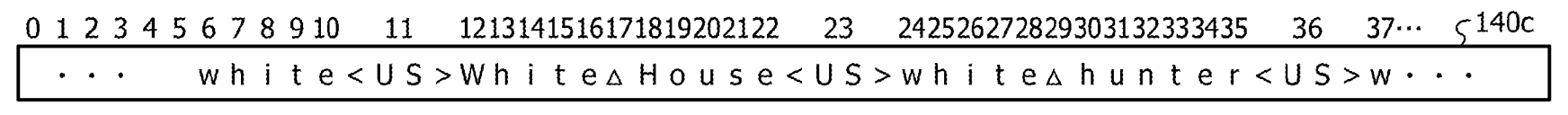

The array data 140c has the words or phrases defined in the dictionary data 140b, in the character string included in the character string data 140a. FIG. 5 illustrates an example of data structure of the array data. In the example illustrated in FIG. 5, in the array data 140c, each word and phrase is divided with <US>. Numerals above the array data 140c indicate the offset from the head "0" of the array data 140c.

The index data 145 corresponds to the index 140d described with reference to FIG. 1. As described later, the index 140d is hushed, and is stored as the index data 145 in the storage unit 140.

The extraction result 140e indicates the words and meaningful phrases as the division candidates, which are extracted from the character string data 140a by below-mentioned processing of the control unit 150.

The control unit 150 has a setting section 150a and an extraction section 150b. The control unit 150 may be embodied as a central processing unit (CPU) or a micro processing unit (MPU). The control unit 150 may be also embodied as a hardwired logic such as an application specific integrated circuit (ASIC) and a field programmable gate array (FPGA).

The setting section 150a is a processing section that generates the array data 140c based on the character string data 140a and the dictionary data 140b, and generates the index data 145 based on the array data 140c.

An example of generating the array data 140c based on the character string data 140a and the dictionary data 140b by the setting section 150a will be described below. The setting section 150a compares the character string data 140a with the dictionary data 140b. The setting section 150a scans the character string data 140a from the head, extracts the character string that hits the word/phrase registered in the dictionary data 140b, and stores the character string in the array data 140c. When the setting section 150a stores the hit character string in the array data 140c and then, the next hit character string in the array data 140c, <US> is set after the former character string, and the next hit character string is stored next to the set <US>. The setting section 150a repeatedly executes the above-mentioned processing to generate the array data 140c.

The setting section 150a generates the array data 140c and then, generates the index 140d. The setting section 150a scans the array data 140c from the head, and associates the character with the offset, the head of the character string with the offset, the end of the character string with the offset, and <US> with the offset, thereby generating the index 140d.

FIG. 6 illustrates an example of data structure of the index. As illustrated in FIG. 6, the index 140d has bitmaps 21 to 32 corresponding to character, Δ (space), <US>, head, and end. For example, the bitmaps corresponding to characters "w", "h", "i", "t", "e", "Δ(space)", "o", "u", "s" are defined as bitmaps 21 to 29. FIG. 6 does not illustrate bitmaps corresponding to other characters.

The bitmap corresponding to <US> is defined as the bitmap 30. The bitmap corresponding to "head" of the character is defined as the bitmap 31. The bitmap corresponding to "end" of the character is defined as the bitmap 32.

For example, in the array data 140c illustrated in FIG. 5, the character "w" is present at the offsets "6, 12, 24" in the array data 140c. For this reason, the setting section 150a sets a flag "1" at the offsets "6, 12, 24" in the bitmap 21 of the index 140d in FIG. 6. Similarly, the array data 140c sets the flag for other characters and <US>.

In the array data 140c illustrated in FIG. 5, the heads of the character of the word and phrase are present at the offsets "6, 12, 24" in the array data 140c. For this reason, the setting section 150a sets the flag "1" at the offsets "6, 12, 24" in the bitmap 31 of the index 140d in FIG. 6.

In the array data 140c illustrated in FIG. 5, the ends of the character of the word and phrase are present at the offsets "10, 22" in the array data 140c. For this reason, the setting section 150a sets the flag "1" at the offsets "10, 22" in the bitmap 32 of the index 140d in FIG. 6.

When generating the index 140d, to reduce the quantity of data of the index 140d, the setting section 150a hashes the index 140d to generate the index data 145.

Figure 7:
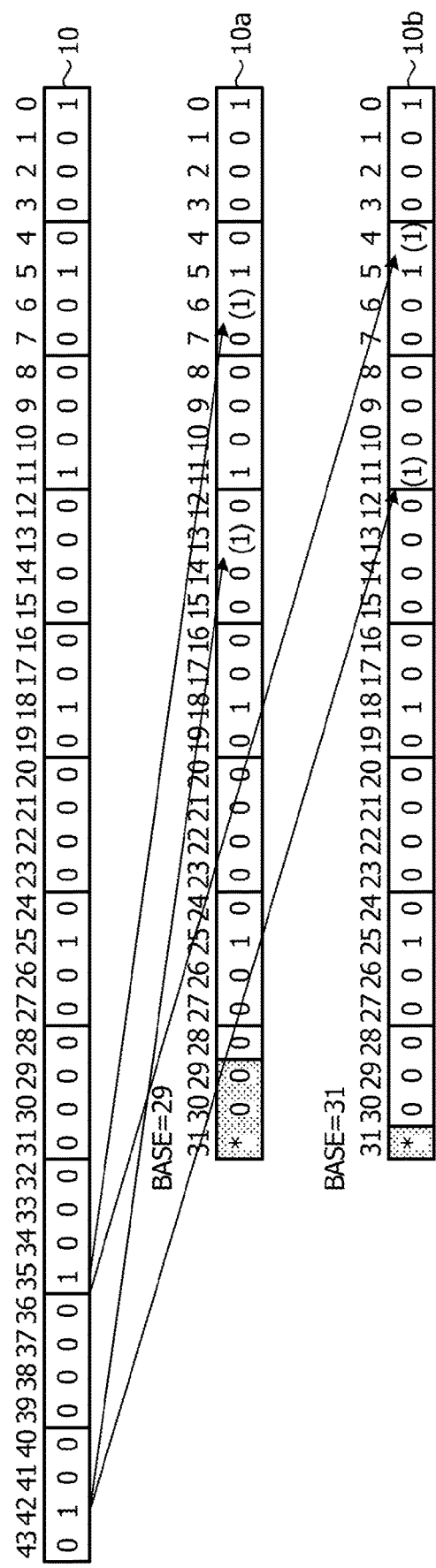
FIG. 7 is a view for describing hashing of the index.

FIG. 7 is a view for describing hashing the index. Here, as an example, the case where a bitmap 10 is included in the index, and the bitmap 10 is hashed will be described below.

For example, the setting section 150a generates a bitmap 10a of a base 29 and a bitmap 10b of a base 31 from the bitmap 10. In the bitmap 10a, a pause is set every offset 29 for the bitmap 10, the set pause is defined as the head, and the flag "1" at the offset is expressed by the flag at the offsets 0 to 28 in the bitmap 10a.

The setting section 150a copies information of the offsets 0 to 28 in the bitmap 10 to the bitmap 10a. The setting section 150a processes information of the offset 29 and following offsets in the bitmap 10a as follows.

The flag "1" is set at the offset "35" in the bitmap 10. Since the offset "35" is the offset "28+7", the setting section 150a sets the "(1)" at the offset "6" in the bitmap 10a. 0 is set at the first offset. The flag "1" is set at the offset "42" in the bitmap 10. Since the offset "42" is the offset "28+14", the setting section 150a sets the flag "(1)" at the offset "11" in the bitmap 10a.

In the bitmap 10b, a pause is set every offset 31 for the bitmap 10, the set pause is defined as the head, and the flag "1" at the offset is expressed by the flag at the offsets 0 to 30 in the bitmap 10b.

The flag "1" is set at the offset "35" in the bitmap 10. Since the offset "35" is the offset "30+5", the setting section 150a sets the flag "(1)" at the offset "4" in the bitmap 10b. 0 is set at the first offset. The flag "1" is set at the offset "42" in the bitmap 10. Since the offset "42" is the offset "30+12", the setting section 150a sets the flag "(1)" at the offset "12" of the bitmap 10b.

The setting section 150a executes the above-mentioned processing to generate the bitmaps 10a, 10b from the bitmap 10. The bitmap 10a, 10b are acquired by hashing the bitmap 10. Here, the length of the bitmap 10 is 0 to 43, and however, even when the length of the bitmap 10 is 43 or more, the flag "1" set in the bitmap 10 may be expressed in the bitmap 10a or the bitmap 10b.

The setting section 150a hashes each of the bitmap 21 to 32 in FIG. 6 to generate the index data 145. FIG. 8 illustrates an example of data structure of the index data. For example, when the bitmap 21 of the index 140d in FIG. 6 is hashed, a bitmap 21a and a bitmap 21b as illustrated in FIG. 8 are generated. When the bitmap 22 of the index 140d in FIG. 6 is hashed, a bitmap 22a and a bitmap 22b as illustrated in FIG. 8 are generated. When the bitmap 30 of the index 140d in FIG. 6 is hashed, a bitmap 30a and a bitmap 30b as illustrated in FIG. 8 are generated. FIG. 8 does not illustrate other hashed bitmaps.

Again, description is made with reference to FIG. 2. The extraction section 150b is a processing section that generates the index 140d based on the index data 145, and extracts a plurality of dividable words or meaningful phrases based on the index 140d.

Figure 9:
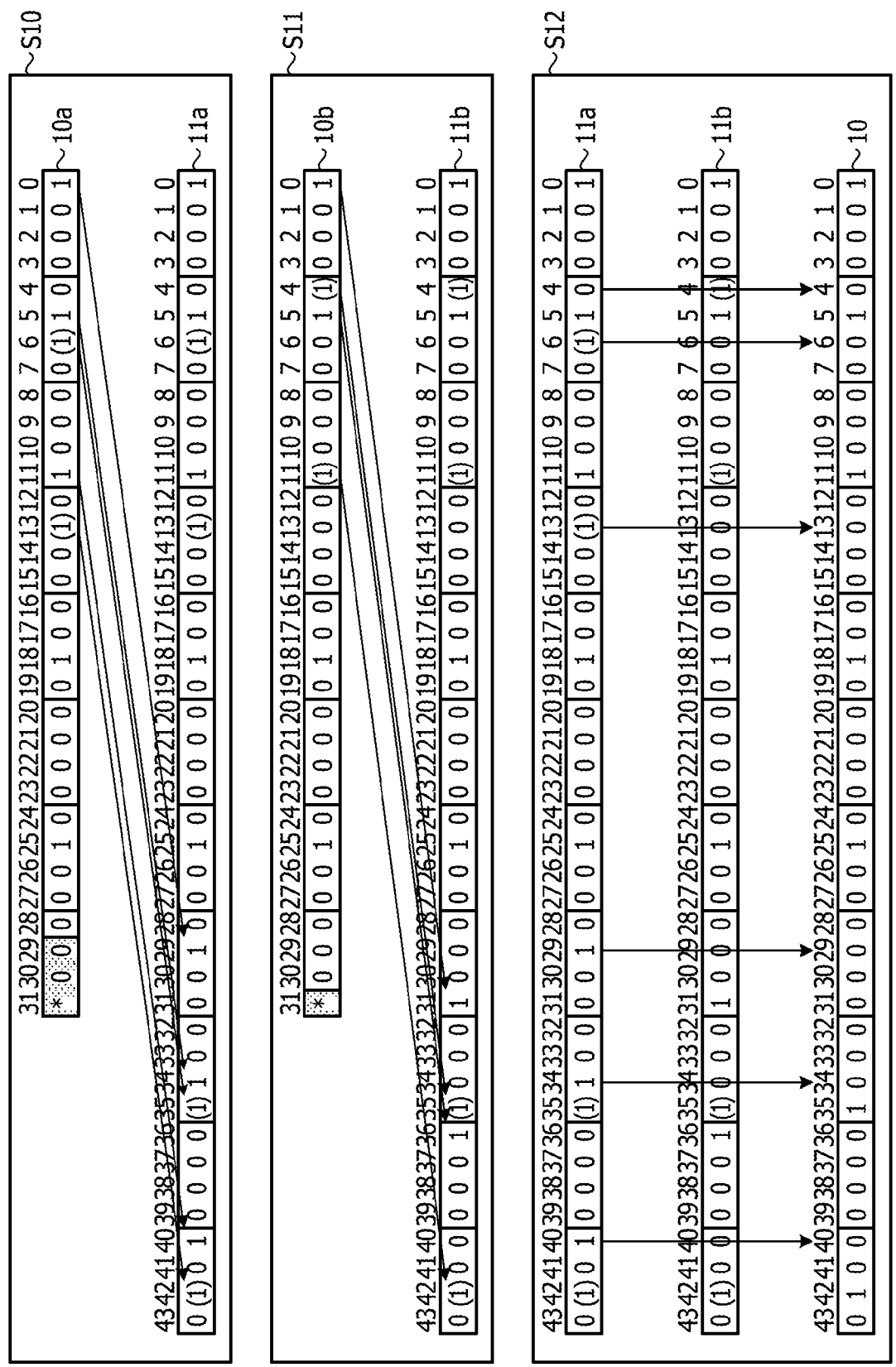
FIG. 9 is a view for describing an example of processing of reconstructing the hashed index.

First, an example of processing of generating the index 140d based on the index data 145 by the extraction section 150b will be described below. FIG. 9 is a view for describing an example of processing of reconstructing the hashed index. Here, as an example, the processing of reconstructing the bitmap 10 based on the bitmap 10a and the bitmap 10b will be described below. The bitmaps 10, 10a, 10b are those illustrated in FIG. 7.

Processing in Step S10 will be described below. The extraction section 150b generates the bitmap 11a based on the bitmap 10a of the base 29. Information on the flags at the offsets 0 to 28 in the bitmap 11a is the same as information on the flags at the offsets 0 to 28 in the bitmap 10a. Information on the flag at the offset 29 and following offsets in the bitmap 11a is a repeat of the information on the flags at the offsets 0 to 28 in the bitmap 10a.

Processing in Step S11 will be described below. The extraction section 150b generates the bitmap 11b based on the bitmap 10b of the base 31. Information on the flag at the offsets 0 to 30 in the bitmap 11b is the same as information on the flag at the offsets 0 to 30 in the bitmap 10b. Information on the flag at the offset 31 and following offsets in the bitmap 11b is a repeat of the information on the flag at the offsets 0 to 30 in the bitmap 10b.

Processing in Step S12 will be described below. The extraction section 150b performs an AND operation of the bitmap 11a and the bitmap 11b to generate the bitmap 10. In the example illustrated in FIG. 9, the flag of the bitmap 11a and the bitmap 11b is "1" at the offsets "0, 5, 11, 18, 25, 35, 42". For this reason, the flag at the offsets "0, 5, 11, 18, 25, 35, 42" in the bitmap 10 is "1". The bitmap 10 becomes a reconstructed bitmap. The extraction section 150b repeatedly executes the same processing for other bitmaps to reconstruct each of the bitmaps, generating the index 140d.

Figure 10:
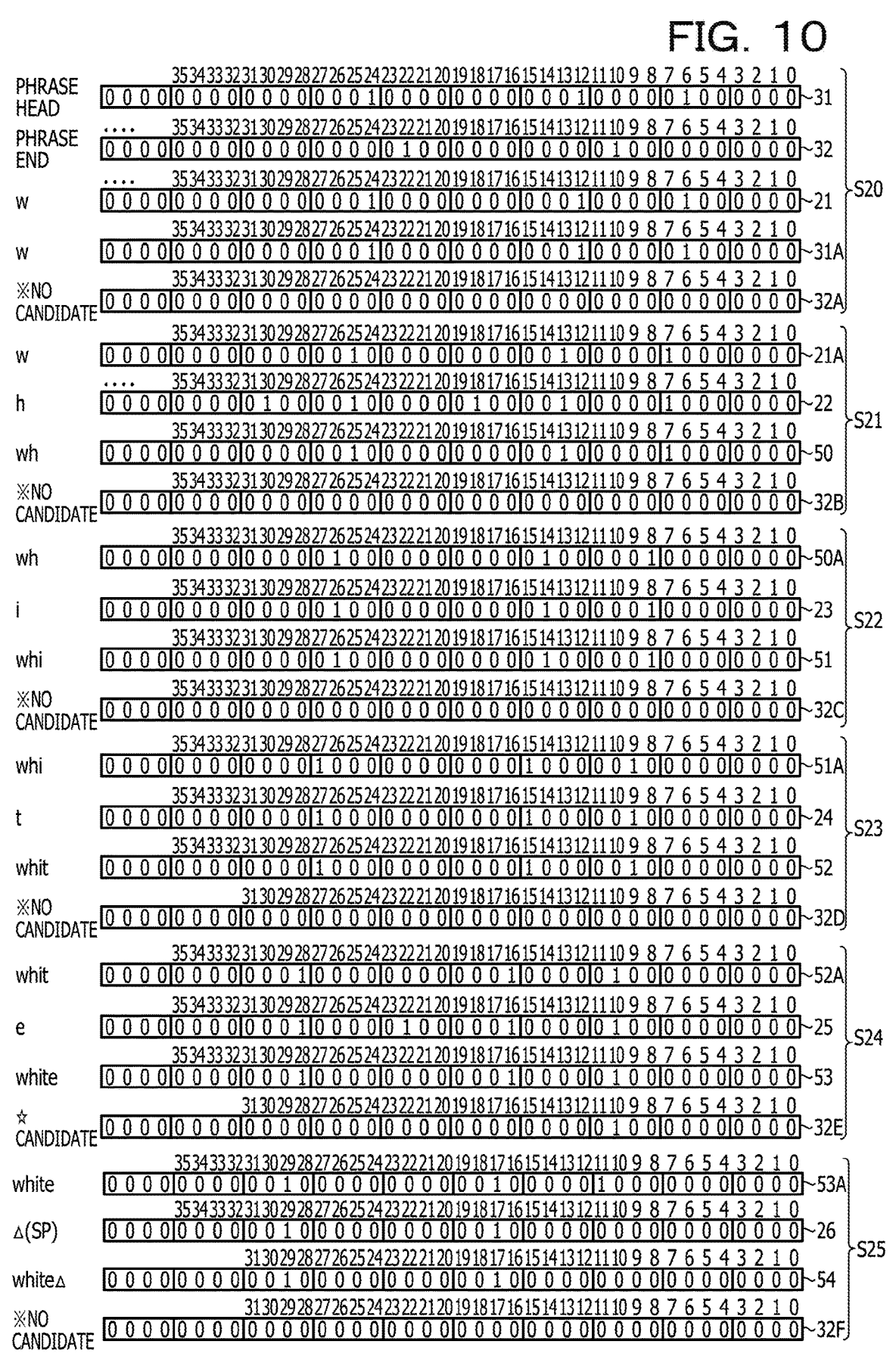
Figure 11:
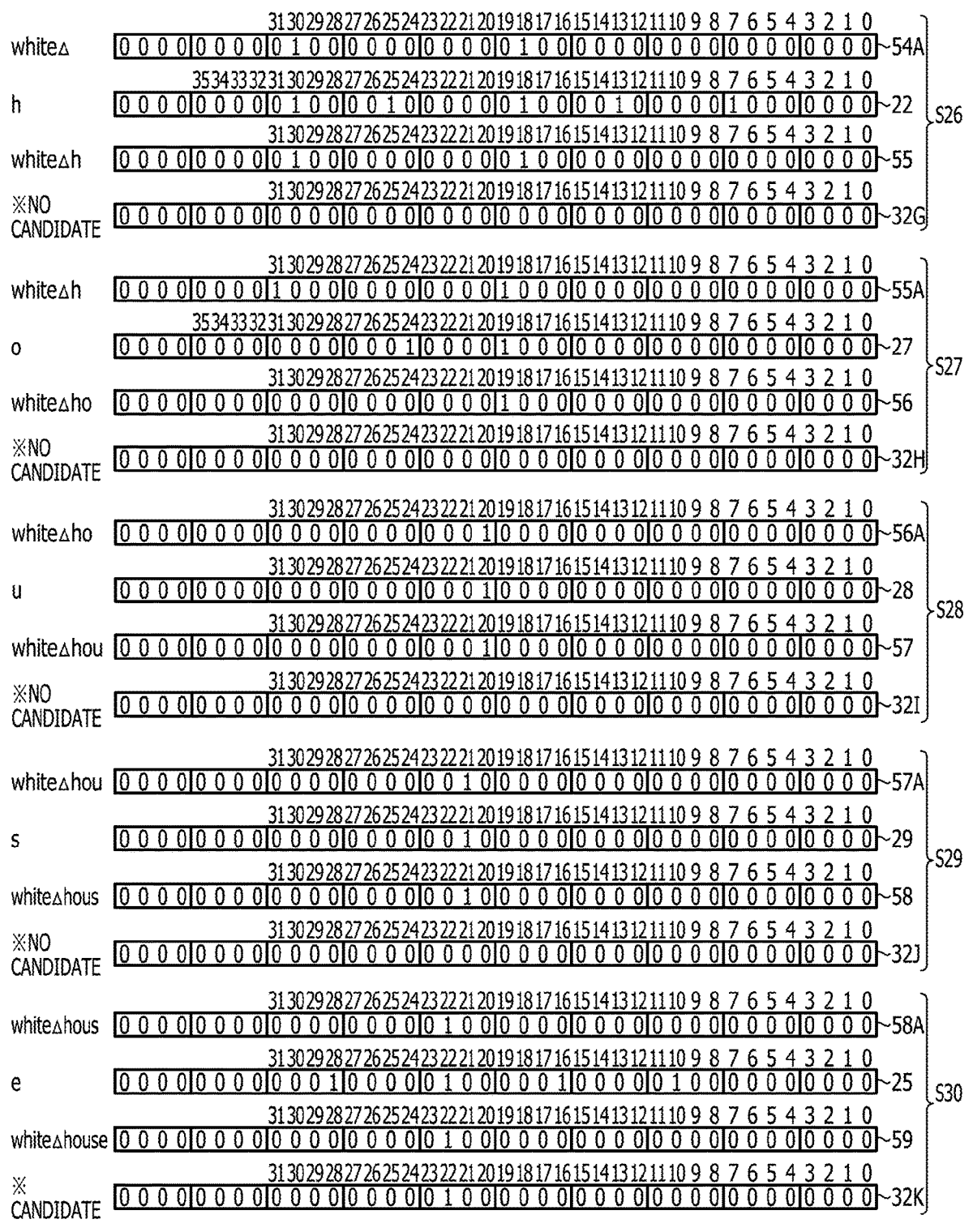

After generating the index 140d, the extraction section 150b extracts dividable words or phrases based on the index 140d. FIGS. 10 and 11 are views for describing an example of extracting words or phrases. In the example illustrated in FIGS. 10 and 11, "WhiteΔHouse . . . " is included in the character string data 140a, and bitmaps of the appropriate characters are sequentially read from the index 140d, from the first character in the character string data 140a.

Step S20 will be described below. The extraction section 150b reads the bitmap 31 of the head, the end bitmap 32, and the bitmap 21 of the character "w" from the index 140d. The extraction section 150b performs an AND operation of the bitmap 31 of the head and the bitmap 21 of the character "w" to identify the position of the head of the character. A result of the AND operation of the bitmap 31 of the head and the bitmap 21 of the character "w" is defined as the bitmap 31A.

In the bitmap 31A, the flag "1" is set at the offsets "6, 12, 24", which indicates that the offsets "6, 12, 24" are heads of the word or phrase.

The extraction section 150b performs an AND operation of the end bitmap 32 and the bitmap 21 of the character "w" to identify the position of the end of the character. A result of the AND operation of the end bitmap 32 and the bitmap 21 of the character "w" is defined as a bitmap 32A. Since the flag "1" is not set in the bitmap 32A, no end candidate is present in "w".

Step S21 will be described below. The extraction section 150b shifts the bitmap 21 of the character "w" to left by one to generate a bitmap 21A. The extraction section 150b reads the bitmap 22 of the character "h" from the index 140d. The extraction section 150b performs an AND operation of the bitmap 21A and the bitmap 22 to generate a bitmap 50 corresponding to the character string "wh".

The extraction section 150b performs an AND operation of the end bitmap 32 and the bitmap 50 of the character string "wh" to identify the position of the end of the character. A result of the AND operation of the end bitmap 32 and the bitmap 50 of the character string "wh" is defined as a bitmap 32B. Since the flag "1" is not set in the bitmap 32B, no end candidate is present in the character string "wh".

Step S22 will be described below. The extraction section 150b shifts the bitmap 50 of the character string "wh" to left by one to generate a bitmap 50A. The extraction section 150b reads the bitmap 23 of the character "i" from the index 140d. The extraction section 150b performs an AND operation of the bitmap 50A and the bitmap 23 to generate a bitmap 51 corresponding to the character string "whi".

The extraction section 150b performs an AND operation of the end bitmap 32 and the bitmap 51 of the character string "whi" to identify the position of the end of the character. A result of the AND operation of the end bitmap 32 and the bitmap 51 of the character string "whi" is defined as the bitmap 32C. Since the flag "1" is not set in the bitmap 32C, no end candidate is present in the character string "whi".

Step S23 will be described below. The extraction section 150b shifts the bitmap 51 of the character string "whi" to left by one to generate a bitmap 51A. The extraction section 150b reads the bitmap 24 of the character "t" from the index 140d. The extraction section 150b performs an AND operation of the bitmap 51A and the bitmap 24 to generate a bitmap 52 corresponding to the character string "whit".

The extraction section 150b performs an AND operation of the end bitmap 32 and the bitmap 52 of the character string "whit" to identify the position of the end of the character. A result of the AND operation of the end bitmap 32 and the bitmap 52 of the character string "whit" is defined as a bitmap 32D. Since the flag "1" is not set in the bitmap 32D, no end candidate is present in the character string "whit".

Step S24 will be described below. The extraction section 150b shifts the bitmap 52 of the character string "whit" to left by one to generate a bitmap 52A. The extraction section 150b reads the bitmap 25 of the character "e" from the index 140d. The extraction section 150b performs an AND operation of the bitmap 52A and the bitmap 25 to generate a bitmap 53 corresponding to the character string "white".

The extraction section 150b performs an AND operation of the end bitmap 32 and the bitmap 53 of the character string "white" to identify the position of the end of the character. A result of the AND operation of the end bitmap 32 and the bitmap 53 of the character string "white" is defined as a bitmap 32E. Since the flag "1" is set in the bitmap 32E, an end candidate "e" is present in the character string "white". The extraction section 150b extracts the character string "white" from the character "w" of the head determined in Step 20 to the character "e" of the end determined in Step 24, as a character string that is a division candidate.

Step S25 will be described below. The extraction section 150b shifts the bitmap 53 of the character string "white" to left by one to generate a bitmap 53A. The extraction section 150b reads the bitmap 26 of the character "Δ (space)" from the index 140d. The extraction section 150b performs an AND operation of the bitmap 53A and the bitmap 26 to generate a bitmap 54 corresponding to the character string "whiteΔ".

The extraction section 150b performs an AND operation of the end bitmap 32 and the bitmap 54 of the character string "whiteΔ" to identify the position of the end of the character. A result of the AND operation of the end bitmap 32 and the bitmap 54 of the character string "whiteΔ" is defined as a bitmap 32F. Since the flag "1" is not set in the bitmap 32F, no end candidate is present in the character string "whiteΔ".

Step S26 will be described below. The extraction section 150b shifts the bitmap 54 of the character string "whiteΔ" to left by one to generate a bitmap 54A. The extraction section 150b reads the bitmap 22 of the character "h" from the index 140d. The extraction section 150b performs an AND operation of the bitmap 54A and the bitmap 22 to generate a bitmap 55 corresponding to the character string "whiteΔh".

The extraction section 150b performs an AND operation of the end bitmap 32 and the bitmap 55 of the character string "whiteΔh" to identify the position of the end of the character. A result of the AND operation of the end bitmap 32 and the bitmap 55 of the character string "whiteΔh" is defined as a bitmap 32G. Since the flag "1" is not set in the bitmap 32G, no end candidate is present in the character string "whiteΔh".

Step S27 will be described below. The extraction section 150b shifts the bitmap 55 of the character string "whiteΔh" to left by one to generate a bitmap 55A. The extraction section 150b reads the bitmap 27 of the character "o" from the index 140d. The extraction section 150b performs an AND operation of the bitmap 55A and the bitmap 27 to generate a bitmap 56 corresponding to the character string "whiteΔho".

The extraction section 150b performs an AND operation of the end bitmap 32 and the bitmap 56 of the character string "whiteΔho" to identify the position of the end of the character. A result of the AND operation of the end bitmap 32 and the bitmap 56 of the character string "whiteΔho" is defined as a bitmap 32H. Since the flag "1" is not set in the bitmap 32H, no end candidate is present in the character string "whiteΔho".

Step S28 will be described below. The extraction section 150b shifts the bitmap 56 of the character string "whiteΔho" to left by one to generate a bitmap 56A. The extraction section 150b reads the bitmap 28 of the character "u" from the index 140d. The extraction section 150b performs an AND operation of the bitmap 56A and the bitmap 28 to generate a bitmap 57 corresponding to the character string "whiteΔhou".

The extraction section 150b performs an AND operation of the bitmap 32 of the end and the bitmap 57 of the character string "whiteΔhou" to identify the position of the end of the character. A result of the AND operation of the bitmap 32 of the end and the bitmap 57 of the character string "whiteΔhou" is defined as a bitmap 32I. Since the flag "1" is not set in the bitmap 32I, no end candidate is present in the character string "whiteΔhou".

Step S29 will be described below. The extraction section 150b shifts the bitmap 57 of the character string "whiteΔhou" to left by one to generate a bitmap 57A. The extraction section 150b reads the character "s" bitmap 29 from the index 140d. The extraction section 150b performs an AND operation of the bitmap 57A and the bitmap 29 to generate a bitmap 58 corresponding to the character string "whiteΔhous".

The extraction section 150b performs an AND operation of the end bitmap 32 and the bitmap 58 of the character string "whiteΔhous" to identify the position of the end of the character. A result of the AND operation of the end bitmap 32 and the bitmap 58 of the character string "whiteΔhous" is defined as a bitmap 32J. Since the flag "1" is not set in the bitmap 32J no end candidate is present in the character string "whiteΔhous".

Step S30 will be described below. The extraction section 150b shifts the bitmap 58 of the character string "whiteΔhous" to left by one to generate a bitmap 58A. The extraction section 150b reads the character "e" bitmap 25 from the index 140d. The extraction section 150b performs an AND operation of the bitmap 58A and the bitmap 25 to generate a bitmap 59 corresponding to the character string "whiteΔhouse".

The extraction section 150b performs an AND operation of the end bitmap 32 and the bitmap 53 of the character string "whiteΔhouse" to identify the position of the end of the character. A result of the AND operation of the end bitmap 32 and the bitmap 59 of the character string "whiteΔhouse" is defined as a bitmap 32K. Since the flag "1" is set in the bitmap 32K, an end candidate "e" is present in the character string "whiteΔhouse". The extraction section 150b extracts the character string "whiteΔhouse" from the character "w" as the head determined in Step 20 to the character "e" as the head determined in Step 30, as a character string that is a division candidate.

The extraction section 150b executes the processing in Steps S20 to S30 to extract the word "white" and the meaningful phrase "WhiteΔHouse". The extraction section 150b stores information on the extracted word and phrase as the extraction result 140e in the storage unit 140.

Figure 12:
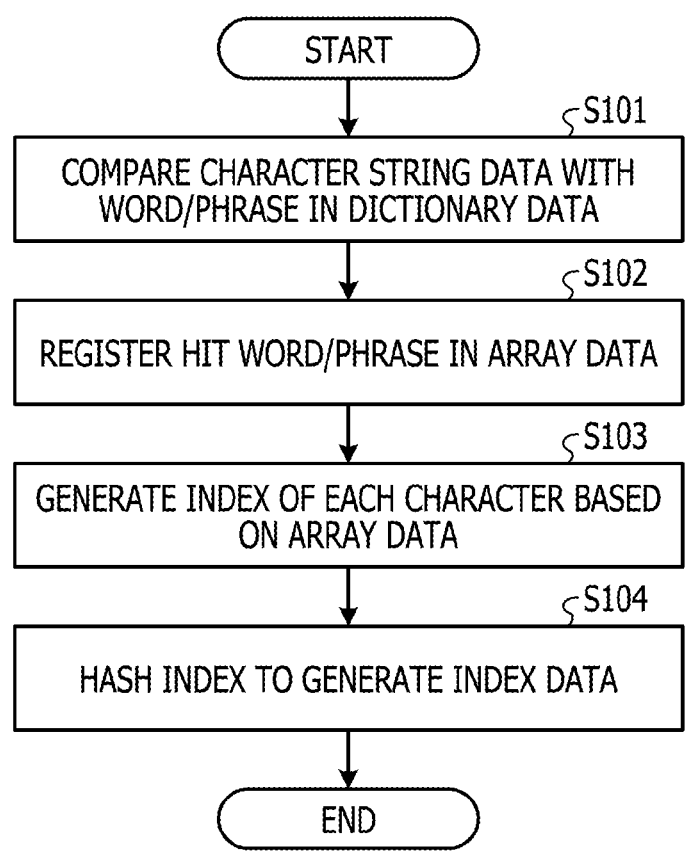
FIG. 12 is a flow chart illustrating a processing procedure of a setting section of the analysis apparatus.

Next, an example of a processing procedure of the analysis apparatus 100 in this embodiment will be described below. FIG. 12 is a flow chart illustrating the processing procedure of the setting section of the analysis apparatus. As illustrated in FIG. 12, the setting section 150a of the analysis apparatus 100 compares the character string data 140a with the word/phrase in the dictionary data 140b (Step S101).

The setting section 150a registers the hit word/phrase in the array data 140c (Step S102). The setting section 150a generates the index 140d based on the array data 140c (Step S103). The setting section 150a hashes the index 140d to generate the index data 145 (Step S104).

Figure 13:
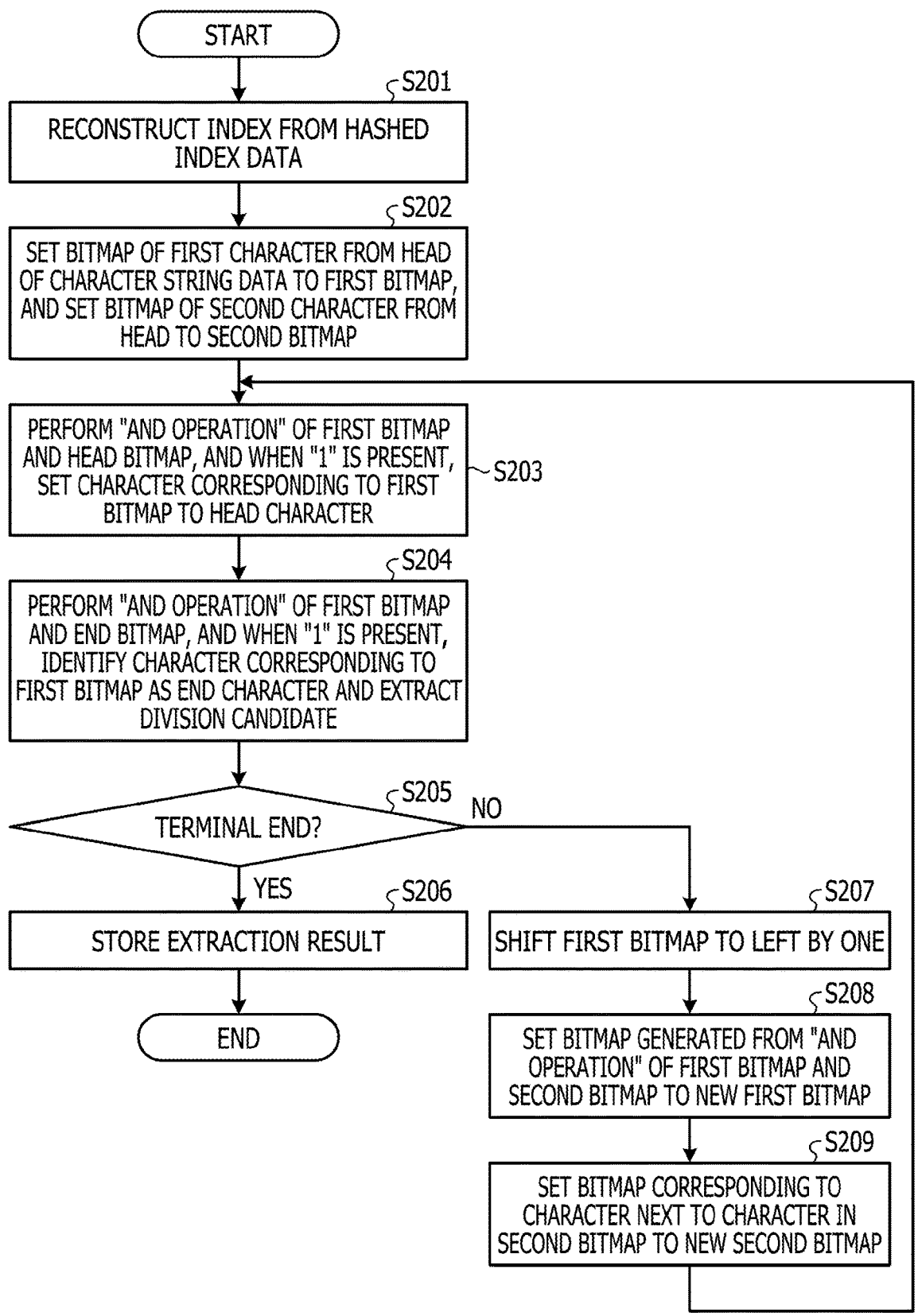
FIG. 13 is a flow chart illustrating a processing procedure of an extraction section of the analysis apparatus.

FIG. 13 is a flow chart illustrating a processing procedure of the extraction section of the analysis apparatus. As illustrated in FIG. 13, the extraction section 150b of the analysis apparatus reconstructs the index 140d from the hashed index data 145 (Step S201).

The extraction section 150b sets a bitmap of the first character from the head in the character string data 140a to a first bitmap, and sets a bitmap of the second character from the head to a second bitmap (Step S202).

The extraction section 150b performs an "AND operation" of the first bitmap and the head bitmap, and when "1"

is present in an operation result, identifies a character corresponding to the first bitmap as a head character (Step S203).

The extraction section 150b performs an "AND operation" of the first bitmap and the end bitmap, and when "1" is present in an operation result, identifies a character corresponding to the first bitmap as an end character, and extracts a division candidate (Step S204).

When the processing reaches the terminal end of the character string data 140a (Step S205, Yes), the extraction section 150b stores the extraction result 140e in the storage unit 140 (Step S206). On the contrary, when the processing does not reach the terminal end of the character string data 140a (Step S205, No), the extraction section 150b proceeds to Step S207.

The extraction section 150b shifts the first bitmap to left by one (Step S207). The extraction section 150b sets a bitmap generated from "AND operation" of the first bitmap and the second bitmap to a new first bitmap (Step S208).

The extraction section 150b sets a bitmap corresponding to a character next to the character in the second bitmap to a new second bitmap (Step S209), and proceeds to Step S203.

Next, effects of the analysis apparatus 100 in this embodiment will be described below. The analysis apparatus 100 generates the index 140d generates registration items of the dictionary data 140b, based on the character string data 140a and the dictionary data 140b, and sets flags that determine the head and the end for each of the registration items. Then, using the index 140d, the analysis apparatus 100 extracts a plurality of dividable words or phrases from the character string data 140a. For example, using the index 140d, a united meaningful character string defined in the dictionary data 140b may be identified according to the flags of the head and the end, and the longest match character string is determined using the character string from the head to the end as a unit of pause, thereby extracting dividable words or phrases. Therefore, words and meaningful phrases may be recognized to achieve analysis using values of the words and phrases.

Further, the index 140d generated by the analysis apparatus 100 includes information on the offsets of the array data 140c generated from the character string data 140a, for each of the plurality of registration items, enabling identification of the position of the dividable words and phrases.

Figure 14:
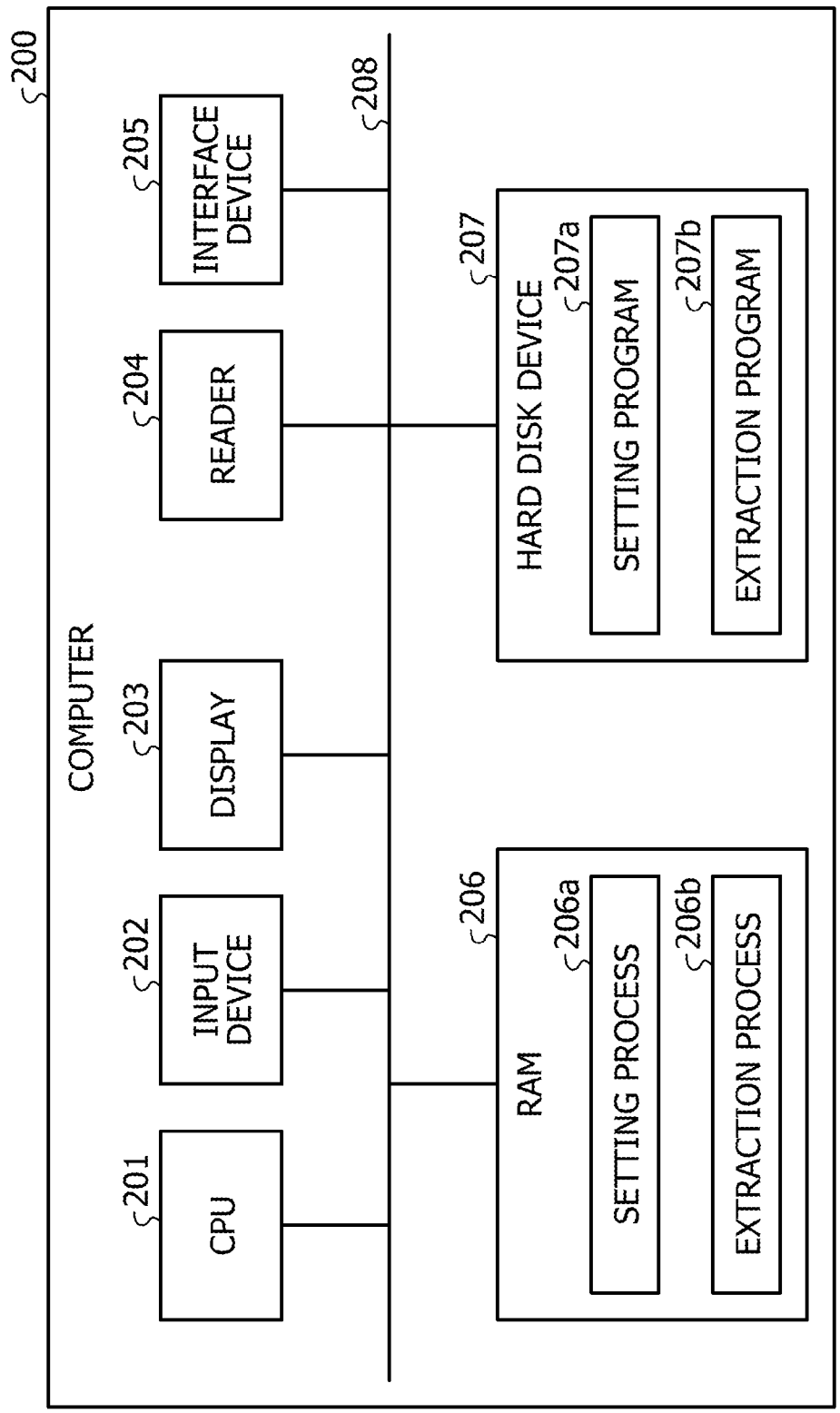
FIG. 14 illustrates an example of a hardware configuration of a computer performing the same functions as the analysis apparatus.

Next, an example of a hardware configuration of a computer performing the same functions as the analysis apparatus 100 described in the above-mentioned embodiment will be described below. FIG. 14 illustrates an example of the hardware configuration of the computer performing the same functions as the analysis apparatus.

As illustrated in FIG. 14, a computer 200 has a CPU 201 that execute various calculations, an input device 202 that accepts data from the user, and a display 203. The computer 200 further has a medium reader 204 that reads a program and so on from a storage medium, and an interface device 205 that exchanges data with other computers via a wired or wireless network. The computer 200 further has a RAM 206 that temporarily stores various information, and a hard disc device 207. The devices 201 to 207 are connected to a bus 208.

The hard disc device 207 has a setting program 207a and an extraction program 207b. The CPU 201 reads and expands the setting program 207a and the extraction program 207b in the RAM 206.

The setting program 207a functions as a setting process 206a. The extraction program 207b functions as an extraction process 206b.

The processing of the setting process 206a corresponds to the processing of the setting section 150a. The processing of the extraction process 206b corresponds to the processing of the extraction section 150b.

The programs 207a, 207b do not have to be stored in the hard disc device 207 in advance. For example, the programs may be stored in a "portable physical medium" inserted into the computer 200, for example, a flexible disc (FD), a CD-ROM, a DVD disc, a magneto-optical disc, and IC card. Then, the computer 200 may read and execute the programs 206a, 207b.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
   registering English terms including two or more English words and a space between the English words in dictionary data, the English terms being a compound word;
   extracting a first string data from character string data based on the dictionary data, the first string data including the English terms registered in the dictionary data;
   generating index information regarding the first string data, the index information indicating appearance positions of each of characters in bitmap format;
   setting flag information to the index information, the flag information indicating head position of each of the English terms in the first string data and end position of each of the English terms in the first string data; and
   extracting, from the character string data, a plurality of dividable English terms registered in the dictionary data by determining a longest match character string using the index information to which the flag information is set.

2. The non-transitory computer-readable storage medium according to claim 1, wherein
   each of the plurality of English terms includes of a plurality of words and has a meaning.

3. The non-transitory computer-readable storage medium according to claim 1, wherein the process further comprises:
   generating information, for the character string data, indicating presence or absence of each of the plurality of English terms.

4. A string data analysis method executed by a computer, the string data analysis method comprising:
   registering English terms including two or more English words and a space between the English words in dictionary data, the English terms being a compound word;
   extracting a first string data from character string data based on the dictionary data, the first string data including the English terms registered in the dictionary data;

generating index information regarding the first string data, the index information indicating appearance positions of each of characters in bitmap format;

setting flag information to the index information, the flag information indicating head position of each of the English terms in the first string data and end position of each of the English terms in the first string data; and extracting, from the character string data, a plurality of dividable English terms registered in the dictionary data by determining a longest match character string using the index information to which the flag information is set.

5. A string data analysis device comprising:

a memory; and a processor coupled to the memory and the processor configured to execute a process, the process comprising:

registering English terms including two or more English words and a space between the English words in dictionary data, the English terms being a compound word;

extracting a first string data from character string data based on the dictionary data, the first string data including the English terms registered in the dictionary data, generating index information regarding the first string data, the index information indicating appearance positions of each of characters in bitmap format, setting flag information to the index information, the flag information indicating head position of each of the English terms in the first string data and end position of each of the English terms in the first string data, and extracting, from the character string data, a plurality of dividable English terms registered in the dictionary data by determining a longest match character string using the index information to which the flag information is set.

* * * * *